United States Patent
Ichikawa (10) Patent No.: US 10,659,689 B2
(45) Date of Patent: May 19, 2020

(54) IMAGE CAPTURE APPARATUS AND CONTROL METHOD (71) Applicant: CANON KABUSHIKI KAISHA, Tokyo (JP)

(72) Inventor: Sho Ichikawa, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/180,315

(22) Filed: Nov. 5, 2018

(65) Prior Publication Data

US 2019/0141243 A1 May 9, 2019

(30) Foreign Application Priority Data

Nov. 7, 2017 (JP) .................................. 2017-215020

(51) Int. Cl.
*H04N 5/232* (2006.01)
*G06F 1/26* (2006.01)
*H02J 7/00* (2006.01)

(52) U.S. Cl.
CPC ......... *H04N 5/23241* (2013.01); *G06F 1/263* (2013.01); *H02J 7/00* (2013.01); *H04N 5/23245* (2013.01)

(58) Field of Classification Search
CPC ............ H04N 5/23241; H04N 5/23245; G06F 1/263; H02J 7/0052
See application file for complete search history.

(56) References Cited

U.S. PATENT DOCUMENTS

| 5,844,606 | A | * | 12/1998 | Suemoto | G11B 31/006 348/375 |
| 9,232,135 | B2 | | 1/2016 | Kim et al. | |
| 9,478,352 | B2 | | 10/2016 | Sakamoto | |
| 2013/0120630 | A1 | | 5/2013 | Kim et al. | |
| 2013/0147282 | A1 | | 6/2013 | Sakamoto | |
| 2014/0380029 | A1 | * | 12/2014 | Tokuda | H04M 1/72569 713/1 |
| 2016/0064958 | A1 | * | 3/2016 | Jung | H02J 7/0068 320/107 |
| 2016/0224081 | A1 | * | 8/2016 | Worthington | G06F 1/206 |
| 2017/0150032 | A1 | * | 5/2017 | Chenn | H04N 5/23206 |

FOREIGN PATENT DOCUMENTS

| JP | 2013-121293 A | 6/2013 |
| JP | 2015-502067 A | 1/2015 |
| WO | 2013/069931 A1 | 5/2013 |

* cited by examiner

Primary Examiner — Timothy J Henn
(74) Attorney, Agent, or Firm — Cowan, Liebowitz & Latman, P.C.

(57) ABSTRACT

An image capture apparatus capable of charging a battery. The image capture apparatus includes a connection unit that receives power from a power supply device, a charging control unit that charges the battery by using power received from the power supply device, a power supply control unit that supplies power to components of the image capture apparatus by using power received from the power supply device, and a control unit that controls charging of the battery and power supply to the components of the image capture apparatus by using power received from the power supply device, according to whether or not an operating mode of the image capture apparatus is restricted due to heat from the battery.

20 Claims, 8 Drawing Sheets

| TYPE OF POWER SUPPLY DEVICE | VOLTAGE | CURRENT | MAXIMUM POWER |
|---|---|---|---|
| DEVICE A | 5.0V | 0.5A | 2.5W |
| DEVICE B | 5.0V | 0.9A | 4.5W |
| DEVICE C | 5.0V | 1.5A | 7.5W |
| DEVICE D | 5.0V | 3.0A | 15W |
| DEVICE E | 20V | 5.0A | 100W |

IMAGE CAPTURE APPARATUS AND CONTROL METHOD

BACKGROUND

Field of the Invention

Aspects of the disclosure generally relate to an image capture apparatus capable of charging a battery, a control method, a program, or the like.

Description of the Related Art

If an internal battery of an electronic device such as an image capture apparatus is charged, the heat produced by the electronic device may increase due to the effects of the heat generated by charging the battery. In an image capture apparatus such as a digital camera, operation restrictions are provided according to temperature due to concerns regarding image degradation from rising temperature, the temperature exceeding the scope of guaranteed operation, or the temperature exceeding the scope of safe operation. For example, in a moving image shooting mode, the operation restrictions placed due to rising temperatures affect the moving image recording duration, and the moving image recording duration is shortened due to the rapid rise of the internal temperature of the apparatus interior caused by heat generated by charging the battery inside the apparatus.

Japanese Patent Laid-Open No. 2013-121293 discloses a method of performing communication for the purpose of changing control related to wireless power supply in a case of a predetermined operating mode. Japanese Patent Laid-Open No. 2015-502067 discloses a method of performing control to switch to a heat generation restricting mode and lower the charge current, the video frame rate, and the resolution if the temperature of heat generated in a mobile terminal device is greater than or equal to a predetermined temperature.

However, in the method disclosed in Japanese Patent Laid-Open No. 2013-121293, wireless power supply stops during a moving image shooting mode. For this reason, the method disclosed in Japanese Patent Laid-Open No, 2013-121293 cannot perform control such that battery charging stops but the power supply to an electronic device is maintained. Also, in the method disclosed in Japanese Patent Laid-Open No. 2015-502067, if the temperature is greater than or equal to a predetermined temperature, battery charging control can be changed by performing a charging control that lowers the charge current but power supply cannot be maintained to an electronic device.

SUMMARY

According to an aspect of the embodiments, an apparatus, a method, a program, or the like is provided that avoids restricting a predetermined operating mode by heat from a battery.

According to an aspect of the embodiments, there is provided an image capture apparatus capable of charging a battery, comprising: a connection unit that receives power from a power supply device; a charging control unit that charges the battery by using power received from the power supply device; a power supply control unit that supplies power to components of the image capture apparatus by using power received from the power supply device; and a control unit that controls charging of the battery and power supply to the components of the image capture apparatus by using power received from the power supply device, according to whether or not an operating mode of the image capture apparatus is restricted due to heat from the battery.

According to an aspect of the embodiments, there is provided a method of controlling an image capture apparatus capable of charging a battery, the method comprising: receiving power from a power supply device; and controlling charging of a battery and power supply to components of the image capture apparatus by using power received from the power supply device, according to whether or not an operating mode of the image capture apparatus is restricted due to heat from the battery.

According to an aspect of the embodiments, there is provided a non-transitory storage medium that stores a program causing a computer to a method of controlling an image capture apparatus capable of charging of a battery, the method comprising: receiving power from a power supply device; and controlling charging of a battery and power supply to components of the image capture apparatus by using power received from the power supply device, according to whether or not an operating mode of the image capture apparatus is restricted due to heat from the battery.

Further aspects of the embodiments will become apparent from the following embodiments.

DESCRIPTION OF THE EMBODIMENTS

Exemplary embodiments, features, and aspects of the disclosure will be described below with reference to the drawings. However, aspects of the disclosure are not limited to the following embodiments.

Apparatus Configuration

The apparatus configuration will first be described in regards to an external view and a configuration of the image capture apparatus 100 in the following embodiments, with reference to FIGS. 1 and 2.

Figure 1:
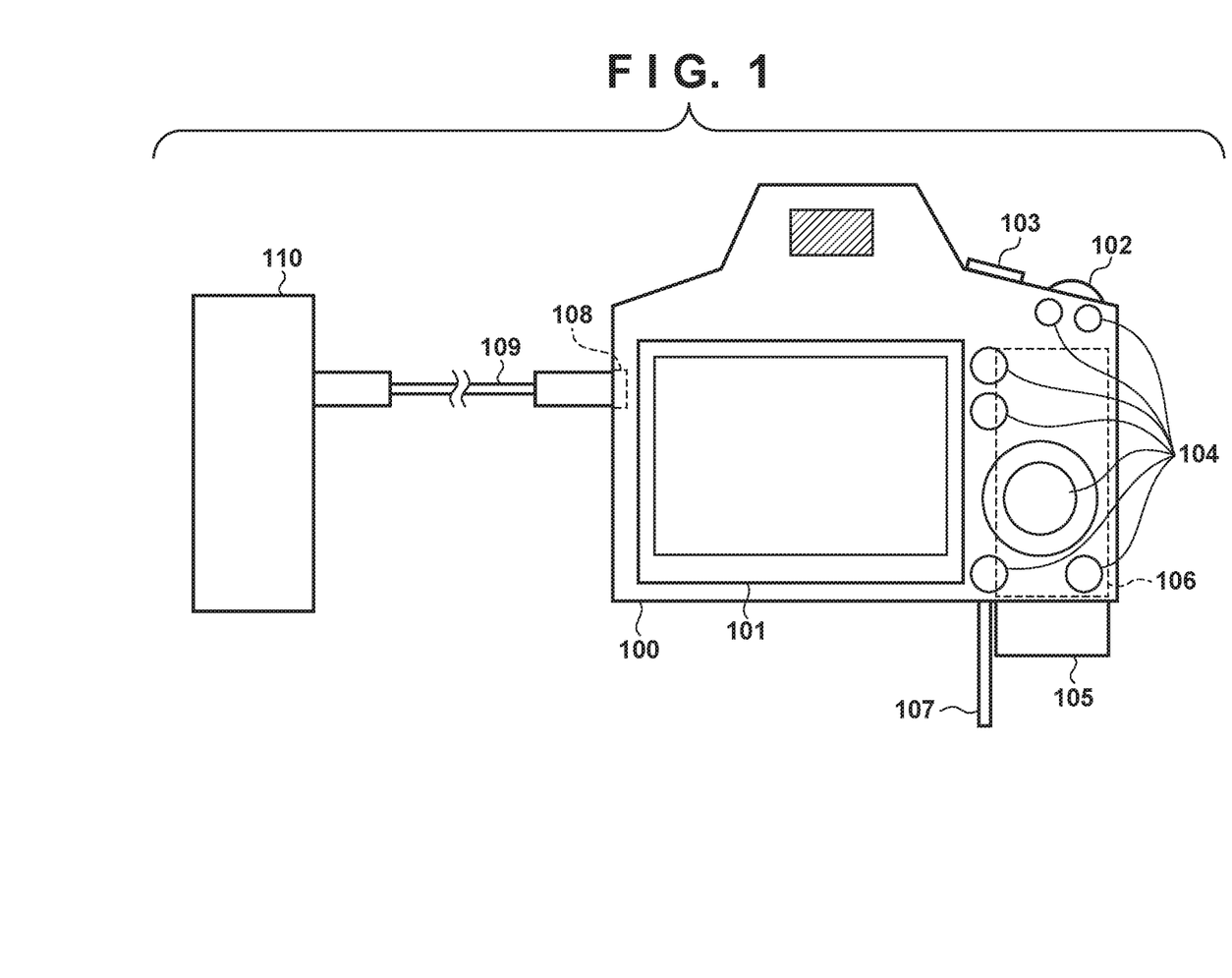
FIG. 1 is a diagram showing an example of an external view of an image capture apparatus 100 in a first embodiment and other embodiments.

FIG. 1 is a diagram showing an external view of the image capture apparatus 100 in the following embodiments.

The image capture apparatus 100 is not limited to a digital camera, and may be a mobile phone with a camera function (a smartphone, for example), a mobile terminal (a tablet terminal, for example), or be capable of operating as at least one of those.

A display unit 101 is constituted by a liquid crystal panel (LCD) that displays images and various information. A shutter switch 102, a mode selection switch 103, and an operation unit 104 are an operation member for the purpose of receiving user operations and inputting various operation instructions to a system control unit 208. The shutter switch 102 gives an image shooting instruction. The mode selection switch 103 switches the operating mode of the image capture apparatus 100.

A battery 105 is a battery that is capable of being charged, such as a lithium ion battery, and is capable of being attached to and detached from the image capture apparatus 100. The battery 105 is a power source unit that supplies power to components of the image capture apparatus 100. Also, the battery 105 is capable of being charged by using power supplied from a power supply device 110 that is connected via a connector 108 and a cable 109. A battery slot 106 is a slot for storing the battery 105. A cover 107 is the cover of the battery slot 106. FIG. 1 shows a state in which the cover 107 is open and a part of the battery 105 is removed from the battery slot 106 and is exposed. The connector 108 is an interface that connects the cable 109 and the image capture apparatus 100.

The connector 108 and the cable 109 are, for example, a Type-B or Type-C connector (hereafter referred to as USB connectors) and a cable (hereafter referred to as a USB cable) that conform to universal serial bus (USB) standards. The power supply device 110 is capable of supplying power to a device that is connected via the USB connector 108 and the USB cable 109, for example. The power supply device 110 is, for example, a personal computer (PC), or a portable battery. When the power supply device 110 is connected to the image capture apparatus 100 via the USB connector 108 and the USB cable 109, the power supply device 110 (the source) and the image capture apparatus 100 (the sink) communicate with each other to mutually determine their roles, the amount of power to be supplied to the image capture apparatus 100, or the like. The image capture apparatus 100 is capable of using power supplied by the power supply device 110 to supply power to components of the image capture apparatus 100 and to charge the battery 105. Note that the connection between the image capture apparatus 100 and the power supply device 110 is not limited to USB, and a variety of interface systems which are capable of communicating data and supplying power can be applied.

Figure 2:
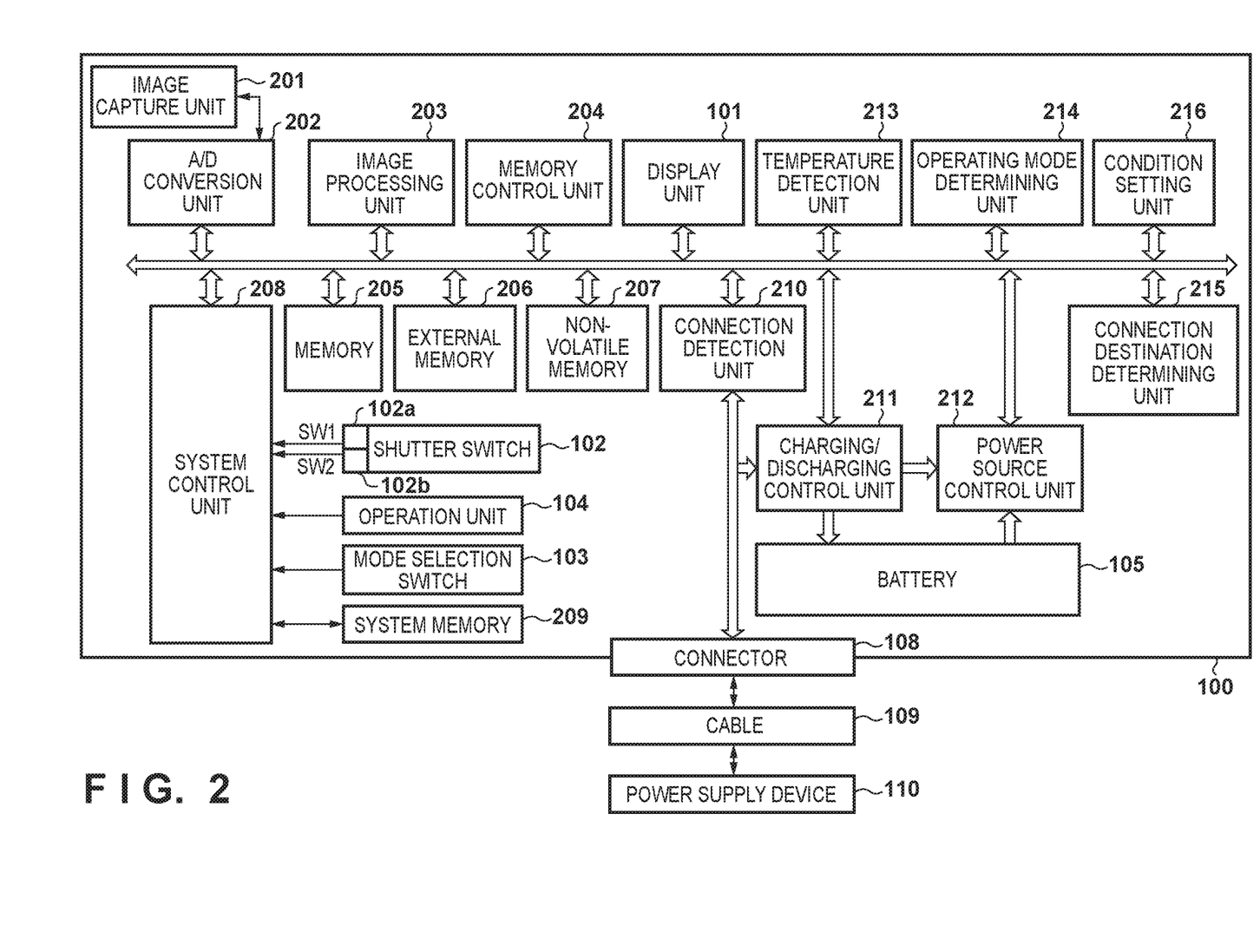
FIG. 2 is a block diagram for illustrating components of the image capture apparatus 100 in the first embodiment and other embodiments.

FIG. 2 is a block diagram illustrating components of the image capture apparatus 100 in the following embodiments.

An image capture unit 201 is an image capture element configured by a CCD, a CMOS, or the like, that converts an optical image of an object that is formed through an optical system (not shown) into an electrical signal. An A/D conversion unit 202 converts an analog signal to a digital signal. The A/D conversion unit 202 is used for the purpose of converting an analog signal, which is output from the image capture unit 201, into a digital signal.

An image processing unit 203 performs predetermined pixel interpolation, resize process referred to as downsizing, and color conversion process on the data from the A/D conversion unit 202, and also on the data from a memory control unit 204. Also, in the image processing unit 203, captured image data is used to perform a predetermined computation process, and the system control unit 208 performs exposure control and focus control based on the obtained computation results. Thus, TTL (Through the Lens) system AF (Automatic Focus) process, AE (Automatic Exposure) process, and EF (Flash pre-emission) process are performed. Furthermore, in the image processing unit 203, predetermined computation process is performed using captured image data, and TTL system AWB (Automatic White Balance) process is performed based on the obtained computation results. The image processing unit 203 performs image record process and moving image recording process in which image data (a still or a moving image) which was generated by the image capture unit 201 is compressed and encoded into a predetermined format (JPEG or H.264, for example), and an image file is generated.

The memory control unit 204 controls the reading and writing of data from and to a memory 205 and an external memory 206. Data output from the A/D conversion unit 202 is directly written to the memory 205 via the image processing unit 203 and the memory control unit 204, or via the memory control unit 204.

The memory 205 stores image data obtained by the image capture unit 201 and converted into digital data by the A/D conversion unit 202, and stores image data for the purpose of being displayed on the display unit 101. The memory 205 is provided with enough storage capacity to store a predetermined number of still images, as well as a predetermined duration of moving images and audio.

The external memory 206 is a recording medium such as a memory card for the purpose of recording image files in a predetermined format, and is configured from a semiconductor memory, a magnetic disk, or the like. The external memory 206 is capable of being attached to and detached from the image capture apparatus 100.

A non-volatile memory 207 is a memory capable of electrical recording and deletion, and an EEPROM, for example, is used. Constants, programs, or the like that are used in the operation of the system control unit 208 are stored in the non-volatile memory 207. The program mentioned here refers to a program for the purpose of executing various flowcharts that will be described later in the following embodiments.

The system control unit 208 performs overall control the image capture apparatus 100. The system control unit 208 realizes the processes of the flowcharts of the following embodiments, which will be described later, by executing a program stored in the non-volatile memory 207. Reference numeral 209 is a system memory, and a RAM is used. Constants, variables, programs read from the non-volatile memory 207, or the like used in the operation of the system control unit 208 are deployed to the system memory 209. Also, the system control unit 208 performs display control by controlling the memory control unit 204, the memory 205, the display unit 101, or the like.

A connection detection unit 210 detects the state of the USB cable 109 and the power supply device 110 being connected to the USB connector 108.

A charging/discharging control unit 211 controls either charging of the battery 105 or supplying power to a power source control unit 212, according to the connection state of the power supply device 110 detected by the connection detection unit 210 and/or the operating mode of the system control unit 208.

The power source control unit 212 has a battery detection circuit and a DC-DC converter, and detects the presence/absence of a mounted battery, the type of the battery and the remaining amount of the battery. Also, the power source control unit 212 controls the DC-DC converter, generates necessary voltage from power that is output from the battery 105 or the charging/discharging control unit 211, and controls power supplied to components of the image capture apparatus 100, including the external memory 206.

A temperature detection unit 213 detects a temperature T of a specific portion of the image capture apparatus 100. The specific portion is, for example, the operation unit 104 or its peripheral portions that are capable of being touched by a user. Note that the specific portion is not limited to the operation unit 104 or a peripheral portion thereof, and may be the battery 105 inside the image capture apparatus 100 or a peripheral portion thereof, a CPU, a MPU, or another processor, or a peripheral portion thereof, which is prone to the effects of heat generated by the battery 105.

An operating mode determining unit 214 determines the operating mode of the system control unit 208. The operating mode includes a still image shooting mode, a moving image shooting mode and a preproduction mode.

A connection destination determining unit 215 determines the type, the power supply capability, and so on, of the power supply device 110 that is connected via the USB connector 108 and the USB cable 109. The determination of the connection destination device is performed using information acquired from communication with the power supply device 110, but this is not limited to any specific method.

A condition setting unit 216 sets the recording conditions (image quality (resolution) and frame rate, for example) in the moving image recording process.

The mode selection switch 103 switches the operating mode of the system control unit 208 to either the still image shooting mode, the moving image shooting mode, the preproduction mode, or the like. The still image shooting mode includes such modes as an automatic mode, an automatic scene determining mode, a manual mode, various scene modes which are scene-specific image shooting settings, a program AE mode, and a custom mode. The mode selection switch 103 can be used to switch directly between any of these modes. Alternatively, after temporarily switching to the still image shooting mode with the mode selection switch 103, another operational member may be used to switch to any of these modes included in the still image shooting mode. In the same manner, the moving image shooting mode may also include a plurality of modes.

A first shutter switch 102a generates a first shutter switch signal SW1 when the shutter switch 102 provided in the image capture apparatus 100 is operated partway, that is to say, is ON with a half-press (image shooting preparation instruction). The first shutter switch signal SW1 starts image shooting preparation process such as AF process, AE process, AWB process, and EF process.

A second shutter switch 102b generates a second shutter switch signal SW2 when the operation of the shutter switch 102 is fully operated, that is to say, is ON with a full-press (image shooting instruction). The system control unit 208 starts a series of image shooting processes in accordance with the second shutter switch signal SW2, from the reading of a signal from the image capture unit 201 to the writing of image data to the external memory 206.

By selecting the types of function icons that are displayed on the display unit 101, the operation members of the operation unit 104 are assigned functions appropriate to the scene and are used as buttons for each function. The function buttons include, for example, an end button, a return button, an image forward button, a jump button, a refine button, a change attribute button, a preproduction button, or the like. For example, a menu screen capable of performing various settings is displayed on the display unit 101 when a menu button is pushed. The user can intuitively perform various settings using the menu screen displayed on the display unit 101 with up, down, left and right four directional buttons and a SET button. Also, the preproduction mode can be switched to when the preproduction button is pressed.

First Embodiment

The first embodiment below describes the method of controlling charging of the battery 105 in the first embodiment using FIG. 3, in addition to FIGS. 1 and 2.

The first embodiment describes an example of a method of controlling charging of the battery 105 with use of power received from the power supply device 110 that is USB connected via the USB connector 108 and the USB cable, based on whether or not the operating mode of the system control unit 208 is the moving image shooting mode.

Figure 3:
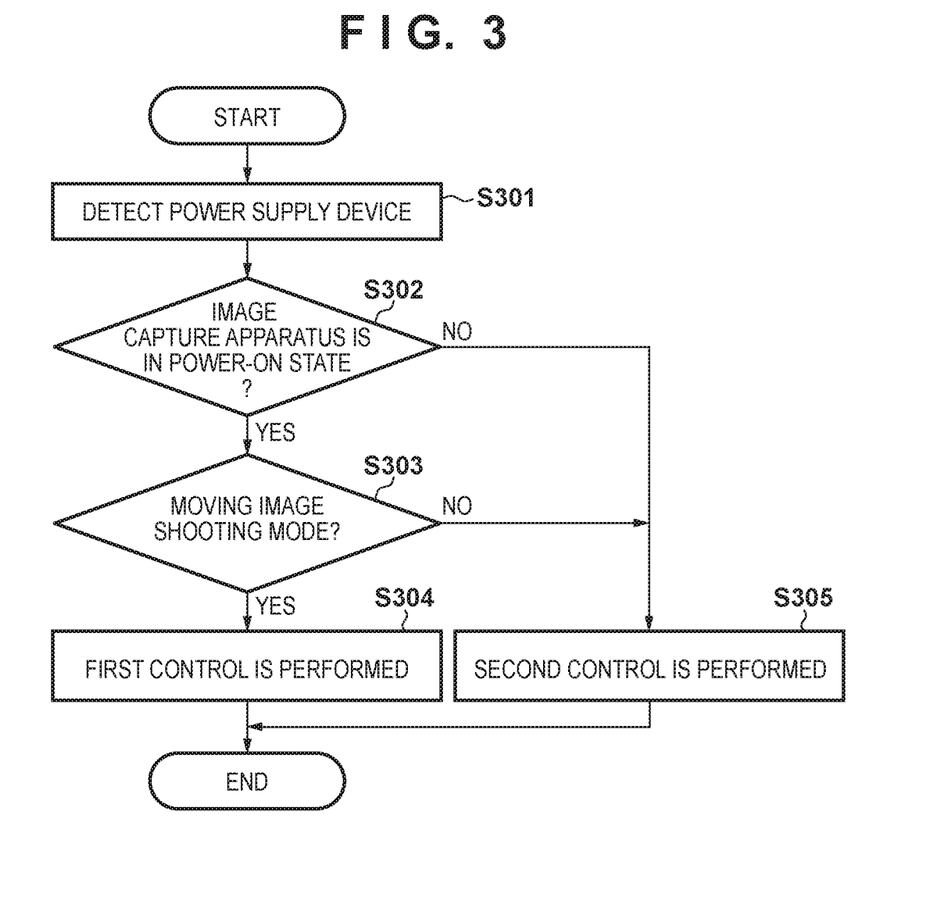
FIG. 3 is a flowchart for illustrating a method of controlling charging of a battery in the first embodiment.

FIG. 3 is a flowchart for the purpose of illustrating the method of controlling charging of the battery 105 in the first embodiment.

Note that the process in the flowchart in FIG. 3 is realized by a program stored in the non-volatile memory 207 being read out to the system memory 209 and being executed by the system control unit 208. The system control unit 208 starts the process upon detecting that the power supply device 110 is connected to the image capture apparatus 100.

In step S301, the system control unit 208 detects that the power supply device 110 is connected with use of the connection detection unit 210 and proceeds to step S302.

In step S302, the system control unit 208 determines whether or not the image capture apparatus 100 is in a power-on state. The procedure proceeds to step S303 if it is determined that the image capture apparatus 100 is in the power-on state, or proceeds to step S305 if it is determined that the image capture apparatus 100 is not in the power-on state.

In step S303, the system control unit 208 determines whether or not the operating mode of the system control unit 208 is the moving image shooting mode. The procedure proceeds to step S304 if it is determined that the operating mode is the moving image shooting mode, or proceeds to step S305 if it is determined that the operating mode is the moving image shooting mode.

In step S304, the system control unit 208 controls the charging/discharging control unit 211 and the power source control unit 212 such that necessary power is supplied to components of the image capture apparatus 100, without charging the battery 105, by using power received from the power supply device 110 (first control). Note that the power supply need not be performed if it is unnecessary. Through such control, it is possible to suppress an operation restriction caused by heat generated from charging the battery 105 in the moving image shooting mode and the shortening of the moving image recording duration can be suppressed.

In step S305, the system control unit 208 controls the charging/discharging control unit 211 and the power source control unit 212 such that the battery 105 is charged and necessary power is supplied to components of the image capture apparatus 100 by using power received from the power supply device 110 (second control). Note that charging may be performed without supplying power if power received from the power supply device 110 is insufficient for power supply other than charging, or if power supply is unnecessary. In a case in which the operating mode is not the moving image shooting mode, charging of the battery 105 and supplying power to the system can be performed at the same time because there is no effect from heat generated by charging the battery 105.

Note that in step S304, charging of the battery 105 is not performed, but in step S404 of FIG. 4, which will be described later, the charging of the battery 105 may be conditionally permitted.

According to the first embodiment, charging of the battery 105, which uses power received from the USB connected power supply device 110, is controlled based on whether or not the operating mode of the system control 208 is the moving image shooting mode. Accordingly, the image capture apparatus 100 being subject to operation restriction caused by heat generated from charging the battery 105 in the moving image shooting mode and the shortening of the moving image recording duration can be suppressed.

Second Embodiment

The second embodiment below describes the method of controlling charging of the battery 105 in the second embodiment using FIG. 4, in addition to FIGS. 1 and 2.

The second embodiment describes an example of a method of controlling charging of the battery 105 with use of power received from the power supply device 110 that is USB connected, based on whether or not the operating mode of the system control unit 208 is the moving image shooting mode, and on the temperature T of the image capture apparatus 100.

Figure 4:
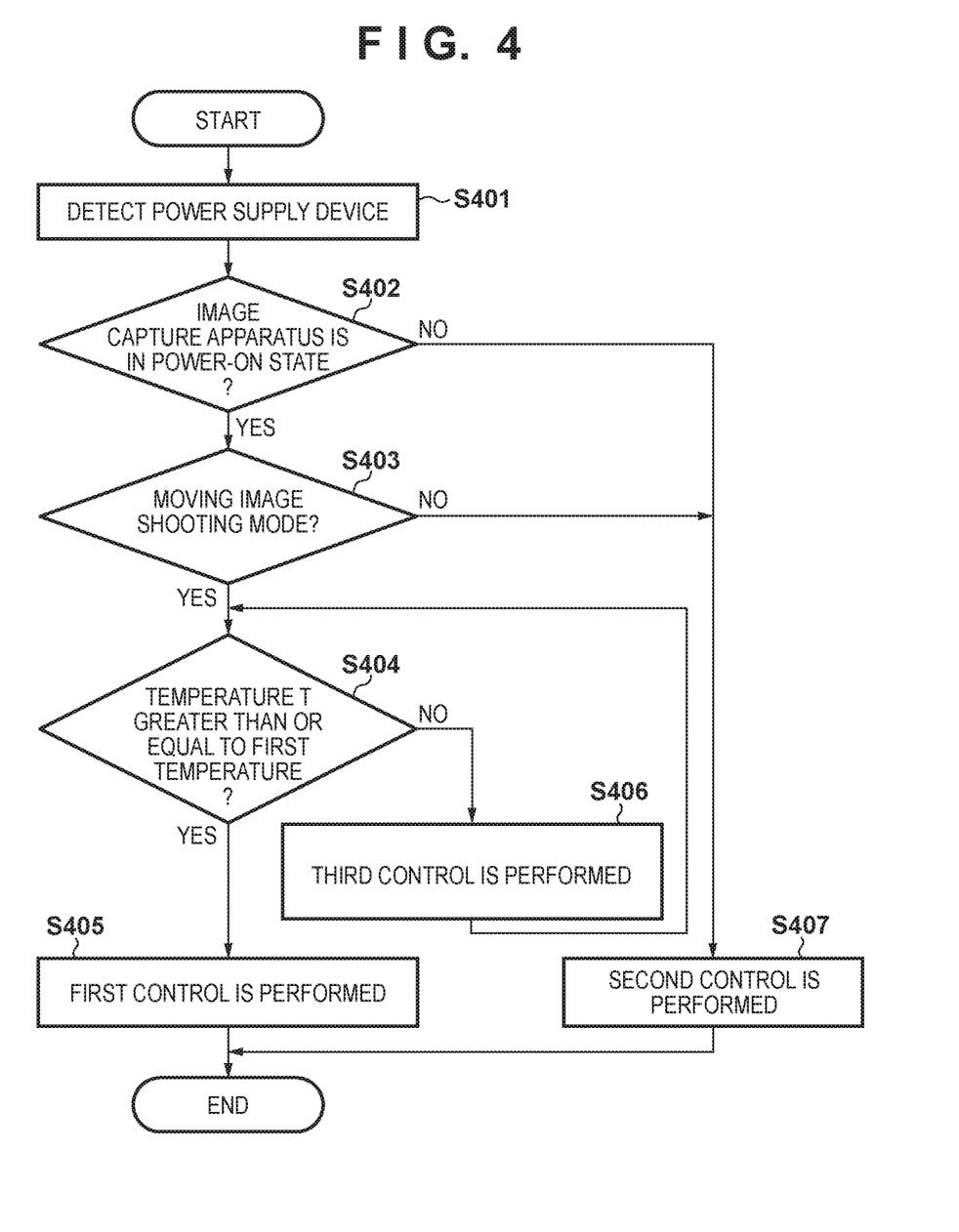
FIG. 4 is a flowchart for illustrating a method of controlling charging of a battery in a second embodiment.

FIG. 4 is a flowchart for the purpose of illustrating the method of controlling charging of the battery 105 in the second embodiment.

Note that process in the flowchart in FIG. 3 is realized by a program stored in the non-volatile memory 207 being read out to the system memory 209 and being executed by the system control unit 208. The system control unit 208 starts the process upon detecting that the power supply device 110 is connected to the image capture apparatus 100.

Note that steps S401 to S403, S405, and S407 in FIG. 4 are the same processes as steps S301 to S305 in FIG. 3 of the first embodiment, and as such their descriptions are omitted.

In step S404, the system control unit 208 determines whether or not the temperature detected by the temperature detection unit 213 is greater than or equal to a predetermined first temperature. The procedure proceeds to step S405 if the temperature is determined to be greater than or equal to the first temperature, or proceeds to step S406 if the temperature determined to be less than the first temperature.

In step S406, the system control unit 208 controls the charging/discharging control unit 211 and the power source control unit 212 such that the battery 105 is conditionally charged and necessary power is supplied to components of the image capture apparatus 100 by using power received from the power supply device 110 (third control). In conditional charging, the system control unit 208 performs control such that charging is maintained while the temperature detected by the temperature detection unit 213 is less than the predetermined first temperature, and charging is stopped when the temperature T is greater than or equal to the predetermined first temperature. Note that charging may be performed without supplying power if power received from the power supply device 110 is insufficient for power supply other than charging, or if power supply is unnecessary. In this way, in a case of the moving image shooting mode, charging of the battery 105 is only performed in a state in which the temperature of the image capture apparatus 100 is less than a first temperature, the state being unaffected by heat generated by charging the battery 105. Note that the temperature-related threshold to is set to a temperature in a suitable margin (35 degrees Celsius, for example) for reaching the restricted temperature of the moving image shooting mode, so that the user does not feel inconvenienced.

Note that the first temperature in step S404 can be any set according to the operation restriction temperature, or the like, of the image capture apparatus 100. Also, the condition for maintaining charging of the battery 105 in step S406 is that the temperature is less than the first temperature, but another condition may be used, such as permitting a predetermined duration of charging.

According to the second embodiment, charging of the battery 105, which uses power received from the USB connected power supply device 110, is controlled based on whether or not the operating mode of the system control unit 208 is the moving image shooting mode, and on the temperature T of the image capture apparatus 100. Accordingly, heat generated by the battery 105 causes the operation restriction to be applied to the image capture apparatus 100, thus it is possible to effectively perform charging while also suppressing the moving image recording time in the moving image shooting mode from being shortened.

Third Embodiment

The third embodiment below describes the method of controlling charging of the battery 105 in the third embodiment using FIGS. 5 and 6, in addition to FIGS. 1 and 2.

The third embodiment describes an example of a method of controlling charging of the battery 105 with the use of power received from the power supply device 110 that is USB connected, based on whether or not the operating mode of the system control unit 208 is the moving image shooting mode, and on the power supply capability of the power supply device 110.

Figure 5:
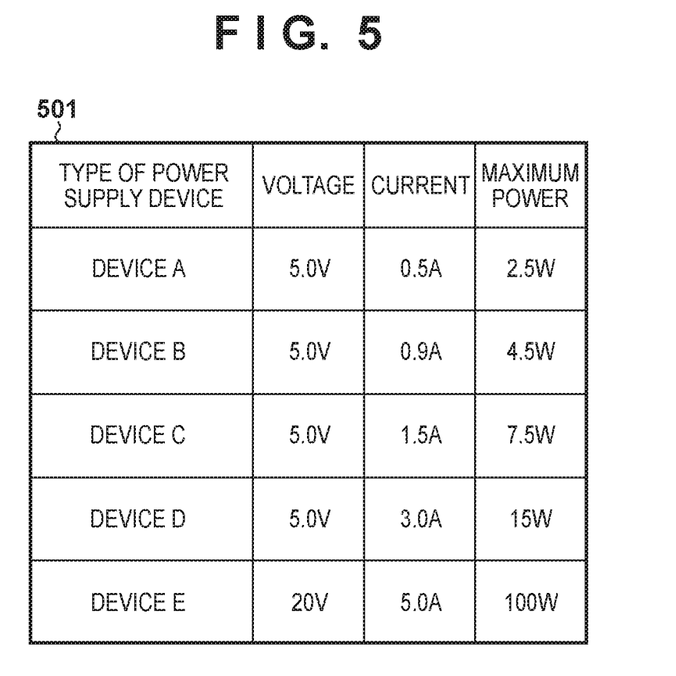
FIG. 5 is a diagram showing an example of the relationship between types and power supply capabilities of the power supply devices.

FIG. 5 is a diagram showing a table 501 that shows an example of the relationship between the types and the power supply capabilities of the power supply devices 110 in the third embodiment.

The table 501 shown in FIG. 5 shows the power supply capabilities at their maximum power. In a case where the type of power supply device is device A, the power supply capability is 2.5 W (voltage: 5.0 V, current: 0.5 A). Also, in a case where the type of power supply device is device B or device C, the power supply capabilities are 4.5 W (voltage: 5.0 V, current: 0.9 A) and 7.5 W (voltage: 5.0 V current: 1.5 A) respectively. Also, in a case where the type of power supply device is device D or device E, the power supply capabilities are 15 W (voltage: 5.0 V, current: 3.0 A) and 100 W (voltage: 20 V, current: 5.0 A) respectively. The power supply capabilities of the power supply devices are determined by the connection destination determining unit 215. Note that, in FIG. 5, six types of power supply devices are displayed, but power supply devices other than these are also possible. Also, the power supply capability is the maximum power, but this can be defined by the current, or the like.

Figure 6:
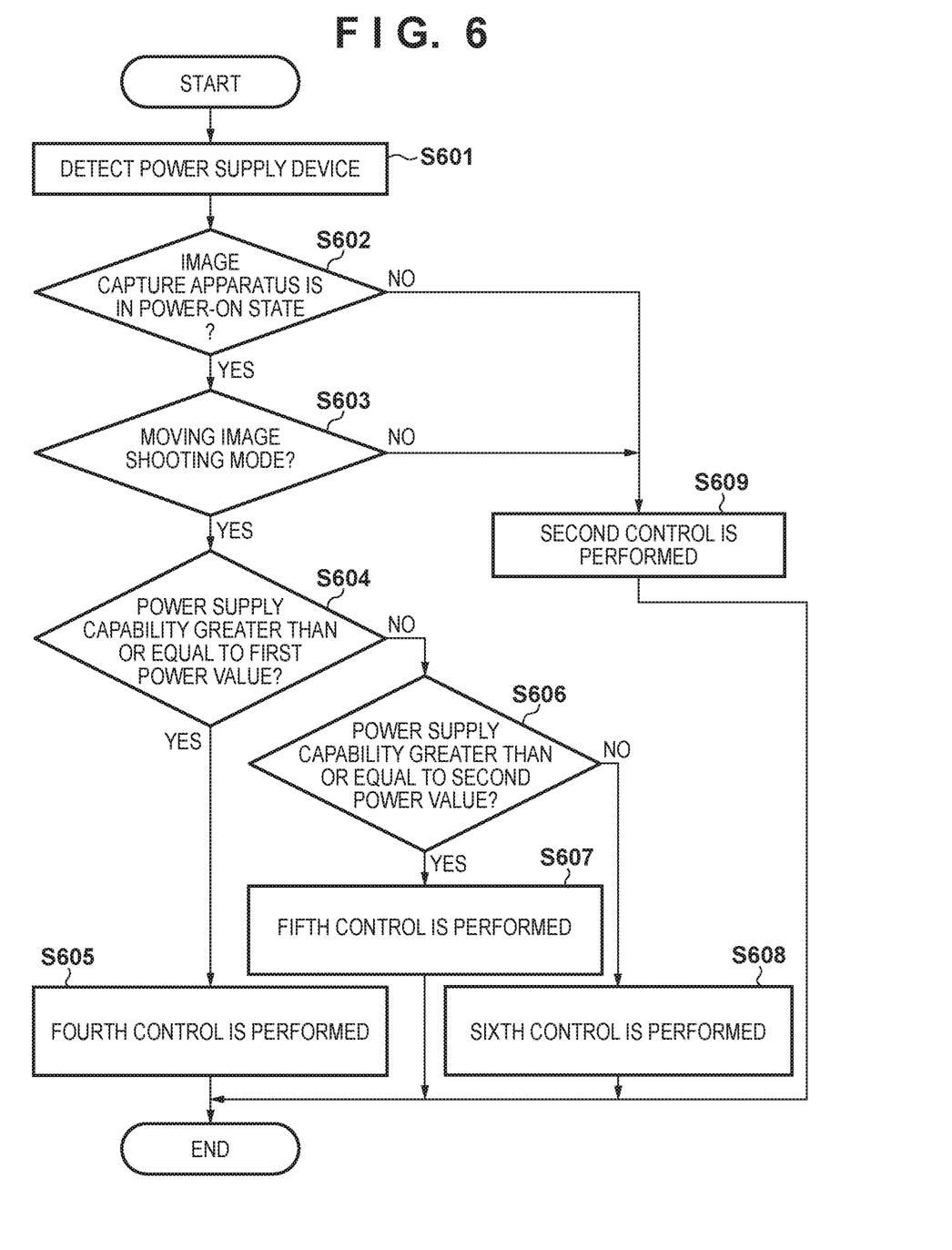
FIG. 6 is a flowchart for illustrating a method of controlling charging of a battery in a third embodiment.

FIG. 6 is a flowchart for illustrating the method of controlling charging of the battery 105 in the third embodiment.

Note that the process in the flowchart in FIG. 6 is realized by a program stored in the non-volatile memory 207 being read out to the system memory 209 and being executed by the system control unit 208. The system control unit 208 starts the process upon detecting that the power supply device 110 is connected to the image capture apparatus 100.

Note that steps S601 to S603 and S609 in FIG. 6 are the same processes as steps S301 to S303 and S305 of FIG. 3 of the first embodiment, and as such their descriptions are omitted.

In step S604, the system control unit 208 determines whether or not the power supply capability of the power supply device 110 determined by the connection destination determining unit 215 is greater than or equal to a predetermined first power value. The procedure proceeds to step S605 if the power supply capability is determined to be greater than or equal to the predetermined first power value, or proceeds to step S606 if the power supply capability is determined to be less than the predetermined first power value.

In step S605, the system control unit 208 controls the charging/discharging control unit 211 and the power source control unit 212 such that the battery 105 is charged by using a second power value, which is smaller than the first power value, received from the power supply device 110 (fourth control). Also, the system control unit 208 controls the charging/discharging control unit 211 and the power source control unit 212 such that necessary power is supplied to components of the image capture apparatus 100 by using power remaining from subtracting the second power value from the first power value (fourth control). Note that power supply need not be performed if unnecessary. Note that the second power value is the lowest possible power value required to charge the battery 105. By performing charging with the minimum power required for charging from power received from the power supply device in this the image capture apparatus 100 is less prone to be subject to operation restrictions due to heat generated from the battery 105, and shortening of the moving image shooting duration in the moving image shooting mode can be suppressed.

In step S606, the system control unit 208 determines whether or not power supply capability of the power supply device 110 determined by the connection destination determining unit 215 is greater than or equal to a predetermined second power value. The procedure proceeds to step S607 if the power supply capability is determined to be greater than or equal to the predetermined second power value, or proceeds to step S608 if the power supply capability is determined to be less than the predetermined second power value.

In step S607, the system control unit 208 controls the charging/discharging control unit 211 and the power source control unit 212 such that the battery 105 is charged by using a second power value of power received from the power supply device 110 (fifth control). Also, the system control unit 208 controls the charging/discharging control unit 211 and the power source control unit 212 such that power is not supplied to components of the image capture apparatus 100, because supplying power to the image capture apparatus 100 cannot be performed with power that is the result of the second power value being subtracted from the received power (fifth control).

In step S608, the system control unit 208 controls the charging/discharging control unit 211 and the power source control unit 212 such that the battery 105 is charged without the charging power being restricted, due to power received from the power supply device 110 being less than the second power value (sixth control). Also, the system control unit 208 controls the charging/discharging control unit 211 and the power source control unit 212 such that supplying power to components of the image capture apparatus 100 is not performed, because power supply to the image capture apparatus 100 cannot be performed with power that is the result of the second power value being subtracted from the received power (sixth control).

Note that the thresholds related to the power supply capability is set to, for example, the first power value=15 W and the second power value=4.5 W Thus, by allowing charging to be performed with minimum power, it is possible to suppress the battery 105 from generating heat, while also power supply to the image capture apparatus 100 can be performed using the remaining power.

Note that the threshold values of the power supply capability in steps S604 and S606 (the first power value and the second power value) can be arbitrarily set according to the charging capability of the battery 105. Also, in steps S605 and S607, charging is performed with the second power value, but an arbitrary power value may be used.

According to the third embodiment, charging of the battery 105, with use of the minimum power required of power received from USB connected power supply device 110 is controlled based on whether or not the operating mode of the system control unit 208 is the moving image shooting mode, and on the power supply capability of the power supply device 110. By allowing the battery 105 to be charged with minimum power in this way, the image capture apparatus 100 is less prone to be subject to operation restriction due to heat generated from the battery 105, and it is possible to effectively perform charging while also suppressing the moving image recording time in the moving image mode shooting from being shortened.

Fourth Embodiment

The fourth embodiment below describes the method of controlling charging of the battery 105 in the fourth embodiment with reference to FIGS. 7A and 7B, in addition to FIGS. 1 and 2.

The fourth embodiment describes an example of a method of controlling charging of the battery 105 with use of power received from the power supply device 110 that is USB connected, based on whether or not the operating mode of the system control unit 208 is the moving image shooting mode, and on recording conditions in the moving image recording process.

Figure 7A:
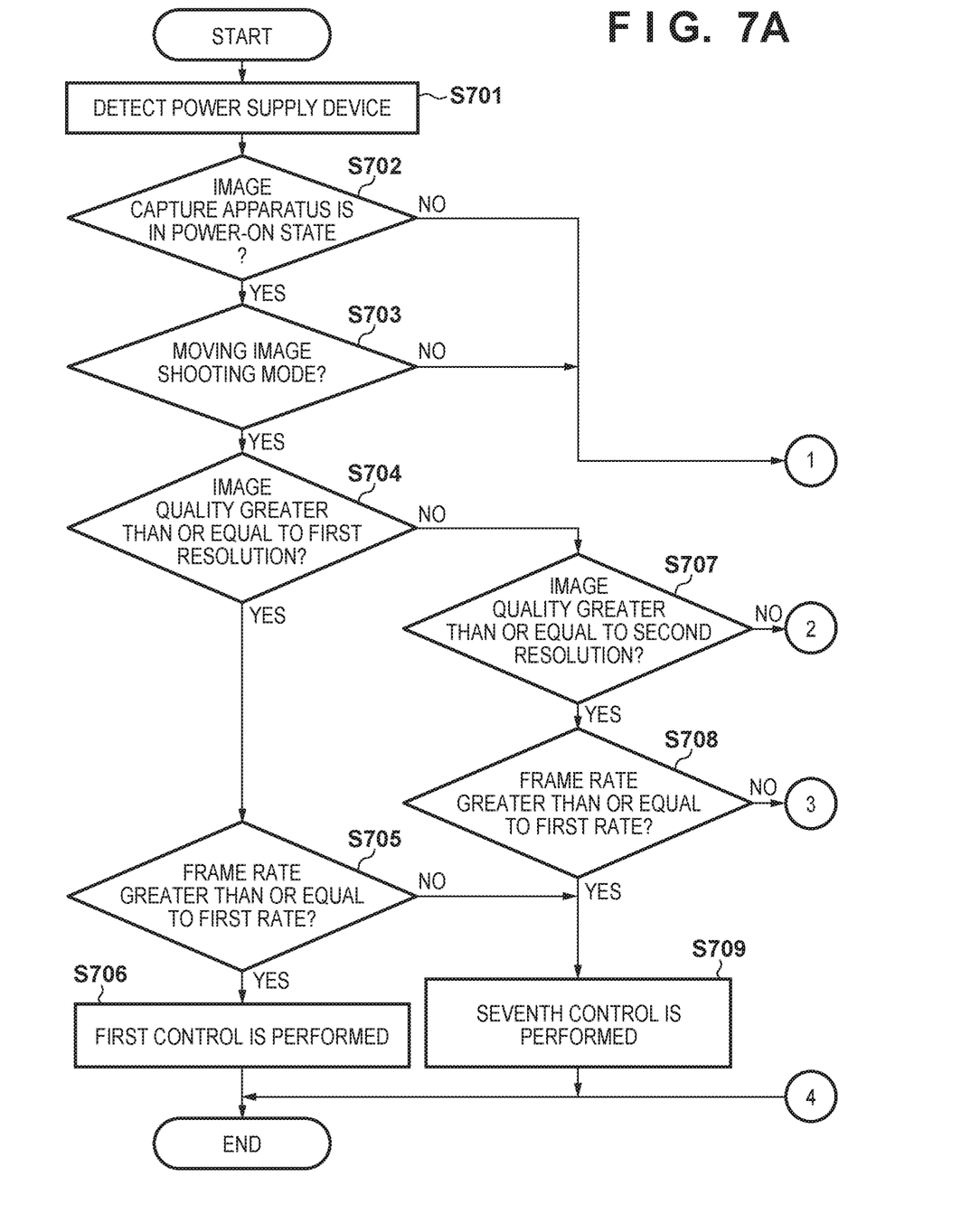
FIGS. 7A and 7B are flowcharts for illustrating a method of controlling charging of a battery in a fourth embodiment.
Figure 7B:
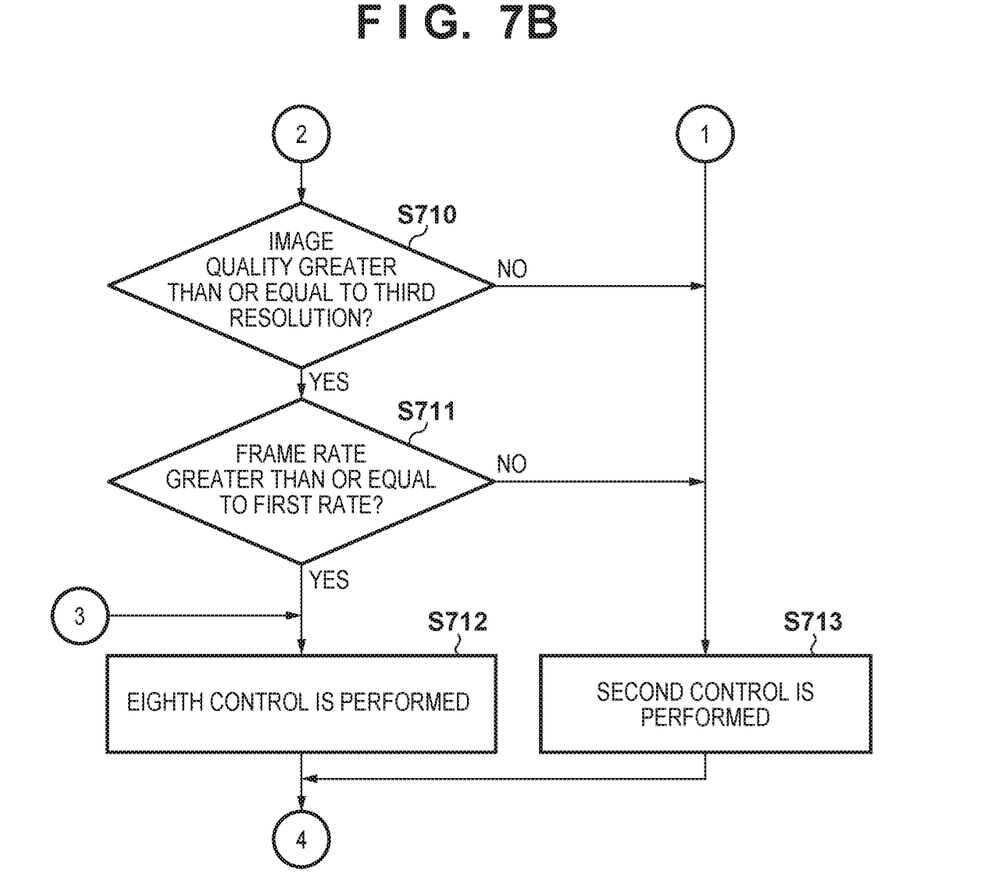

FIGS. 7A and 7B are flowcharts for the purpose of illustrating the method of controlling charging of the battery 105 in the fourth embodiment.

Note that the process in the flowchart in FIGS. 7A and 7B is realized by a program stored in the non-volatile memory 207 being read out to the system memory 209 and being executed by the system control unit 208. The system control unit 208 starts the process upon detecting that the power supply device 110 is connected to the image capture apparatus 100.

Note that steps S601 to S603 in FIGS. 6, S706, and S713 in FIGS. 7A and 7B are the same processes as steps S301 to S305 in FIG. 3 of the first embodiment, and as such their descriptions are omitted.

In step S704, the system control unit 208 determines whether or not the image quality (resolution) set by the condition setting unit 216 is set greater than or equal to a first resolution. The procedure proceeds to step S705 if it is determined that the control setting unit 216 has set the image quality (resolution) greater than or equal to the first resolution, or proceeds to step S707 if it is determined that the control setting unit 216 has set the image quality (resolution) to less than the first resolution.

In step S705, the system control unit 208 determines whether or not the frame rate set by the condition setting unit 216 is greater than or equal to a first rate. The procedure proceeds to step S706 if it is determined that the condition setting unit 216 has set the frame rate greater than or equal to the first rate, or proceeds to step S709 if it is determined that the condition setting unit 216 has set the frame rate less than the first rate.

In step S707, the system control unit 208 determines whether or not the image quality (resolution) set by the condition setting unit 216 is greater than or equal to a second resolution that is lower than the first resolution. The procedure proceeds to step S708 if it is determined that the condition setting unit 216 has set the image quality (resolution) to be greater than or equal to the second resolution, and proceeds to step S710 if it is determined that the condition setting unit 216 has set the image quality to less than the second resolution.

In step S708, the system control unit 208 determines whether or not the frame rate set by the condition setting unit 216 is greater than or equal to the first rate. The procedure proceeds to step S709 if it is determined that the condition setting unit 216 has set the frame rate to be greater than or equal to the first rate, or proceeds to step S712 if it is determined that the condition setting unit 216 has set the frame rate to less than the first rate.

In step S709, the system control unit 208 uses power received from the power supply device 110 to charge the battery 105 until a predetermined first duration has elapsed. Also, the charging/discharging control unit 211 and the power source control unit 212 are controlled such that charging stops after the first duration has elapsed (seventh control). Also, the system control unit 208 controls the charging/discharging control unit 211 and the power source control unit 212 such that necessary power is supplied to components of the image capture apparatus 100 by using the remaining power (seventh control). Note that charging may be performed without supplying power if power received from the power supply device 110 is insufficient for power supply other than charging, or if power supply is unnecessary. In this way, in the case of the moving image shooting mode, if the image quality (resolution) is greater than or equal to the second resolution, in which the heat generated by moving image recording process is less than the heat generated in the case of the first resolution, then charging with use of power received from the power supply device 110 is only performed during the predetermined first period.

In step S710, the system control unit 208 determines whether or not the image quality (resolution) set by the condition setting unit 216 is greater than or equal to a third resolution which is lower than the second resolution. The procedure proceeds to step S711 if it is determined that the condition setting unit 216 has set the image quality (resolution) to be greater than or equal to the third resolution, or proceeds to step S713 if it is determined that the condition setting unit 216 has set to the image quality (resolution) to less than the third resolution. In step S711, the system control unit 208 determines whether or not the frame rate set by the condition setting unit 216 is greater than or equal to a first rate. The procedures proceeds to step S712 if it is determined that the condition setting unit 216 has set the image quality (resolution) to be greater than or equal to the first rate, or proceeds to step S713 if it is determined that the condition setting unit 216 has set the image quality (resolution) to be less than the first rate.

In step S712, the system control unit 208 charges the battery 105 until a predetermined second duration, which is longer than the predetermined first duration, has elapsed using power received from the power supply device 110. Also, the charging/discharging control unit 211 and the power source control unit 212 are controlled such that charging stops after the second duration has elapsed (eighth control). Also, the system control unit 208 controls the charging/discharging control unit 211 and the power source control unit 212 such that necessary power is supplied to components of the image capture apparatus 100 by using the remaining power (eighth control). Note that charging may be performed without supplying power if power received from the power supply device 110 is insufficient for power supply other than charging, or if power supply is unnecessary. In this way, in the case of the moving image shooting mode, if the image quality (resolution) is greater than or equal to the third resolution, in which the heat generated by moving image recording process is less than the heat generated in the case of the second resolution, then charging with use of power received from the power supply device 110 is only performed during the predetermined first period.

Note that the threshold values related to image quality (resolution) are, for example, set to a first resolution of 8K (7680×4320), a second resolution of 4K (3840×2160), and a third resolution of FULL HD (1920×1080). The threshold value related to the frame rate has, for example, a first rate set to 60 fps.

Note that in FIGS. 7A and 7B, image quality (resolution) and frame rate are illustrated as recording conditions in the moving image recording process, but other setting items may be used. Also, a determination may be made regarding at least either the image quality or the frame rate. Also, the image quality threshold values (the first resolution, the second resolution, and the third resolution) in steps S704, S707 and S710 can be set to any values, and the number of threshold values can be changed. Also, the frame rate threshold value (the first rate) in steps S705, S708 and S711 can be set to any values and the number of threshold values can be changed. The charge durations (the first duration and the second duration) in steps S709 and S712 can be set to any values. Also, a condition other than time, such as temperature, may be used.

According to the fourth embodiment, charging of the battery 105, which uses power received from the USB connected power supply device 110, is controlled depending on whether or not the operating mode of the system control unit 208 is the moving image shooting mode, and also depending on recording conditions in the moving image recoding process. In this way, by allowing charging of the battery 105 only during periods in which heat generated by the processor that executes moving image recording process, or the like, the image capture apparatus 100 is less prone to being subject to operation restrictions from heat generated by the battery 105, or other heat. Accordingly, it is possible to effectively perform charging while also suppressing the moving image recording time in the moving image shooting mode from being shortened.

Note that embodiments of the disclosure are not limited to the first to fourth embodiments described above. Changes or revisions made to the first to fourth embodiments within a scope that does not deviate from the subject-matter of the disclosure are included in embodiments of the disclosure.

The first to fourth embodiments above describe a method of controlling charging of the battery 105 based on whether or not the operating mode of the system control unit 208 is the moving image shooting mode, but the first to fourth embodiments are not limited to this. For example, the first to fourth embodiments can be applied to a variety of operating modes, such as an operating mode that is subject to operational restriction according to rising temperature other than the moving image shooting mode, or an operating mode in which the computation processing load on the processor is high. Also, the second to fourth embodiments above describe methods of controlling charging of the battery, based on temperature, power supply capability, and recording conditions in the moving image recording process, in addition to whether or not the system control unit 208 is in the moving image shooting mode, but may be a combination of at least two of these conditions.

Other Embodiments

Embodiment(s) of the disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2017-215020, filed Nov. 7, 2017, which is hereby incorporated by reference herein in its entirety.

What is claimed is:

1. An image capture apparatus, comprising:
a power receiving circuitry that receives power from a power supply device;
a charging control circuitry that charges a battery by using power received from the power supply device;
a power supply control circuitry that supplies power to components of the image capture apparatus by using power received from the power supply device;
a determining circuitry that determines a power supply capability of the power supply device; and
a control circuitry that controls the charging control circuitry and the power supply control circuitry,
wherein, in a case where the power supply capability of the power supply device determined by the determining unit is greater than or equal to a first power when an operating mode of the image capture apparatus is a moving image shooting mode, the control unit controls the charging control circuitry such that charging of the battery is performed with a second power obtained from power received from the power supply device, and controls the power supply control circuitry such that power supply to the components of the image capture apparatus is performed with a remaining power of power received from the power supply device, and
in a case where the power supply capability of the power supply device determined by the determining unit is greater than or equal to the second power and lower than the first power when the operating mode of the image capture apparatus is the moving image shooting mode, the control unit controls the charging control circuitry such that charging of the battery is performed with the second power obtained from power received from the power supply device, and controls the power supply control circuitry such that power supply to the components of the image capture apparatus is not performed with a remaining power of power received from the power supply device.

2. The image capture apparatus according to claim 1, wherein, in a case where the power supply capability of the power supply device determined by the determining unit is lower than the second power when the operating mode of the image capture apparatus is the moving image shooting mode, the control unit controls the charging control circuitry such that charging of the battery is performed with power received from the power supply device, and controls the power supply control circuitry such that power supply to the components of the image capture apparatus is not performed with power received from the power supply device.

3. The image capture apparatus according to claim 1, wherein the power supply capability of the power supply device determined by the determining unit is 2.5 W, 4.5 W, 7.5 W, 15 W, or 100 W.

4. The image capture apparatus according to claim 1, wherein the first power is 15 W.

5. The image capture apparatus according to claim 1, wherein the second power is 4.5 W.

6. The image capture apparatus according to claim 1, wherein the power receiving circuitry receives power from the power supply device via a USB cable.

7. The image capture apparatus according to claim 1, wherein the image capture apparatus is capable of acting as a digital camera.

8. The image capture apparatus according to claim 1, wherein the image capture apparatus is capable of acting as a mobile phone or a smartphone.

9. The image capture apparatus according to claim 1, wherein the image capture apparatus is capable of acting as a mobile terminal a tablet terminal.

10. A method comprising:
causing a determining circuitry of an image capture apparatus to determine a power supply capability of a power supply device;
receiving power supplied from the power supply device;
in a case where the power supply capability of the power supply device determined by the determining unit is greater than or equal to a first power when an operating mode of the image capture apparatus is a moving image shooting mode, controlling a charging control circuitry of the image capture apparatus such that charging of a battery is performed with a second power obtained from power received from the power supply device, and controlling a power supply control circuitry of the image capture apparatus such that power supply to components of the image capture apparatus is performed with a remaining power of power received from the power supply device; and
in a case where the power supply capability of the power supply device determined by the determining unit is greater than or equal to the second power and lower than the first power when the operating mode of the image capture apparatus is the moving image shooting mode, controlling the charging control circuitry such that charging of the battery is performed with the second power obtained from power received from the power supply device, and controlling the power supply control circuitry such that power supply to the components of the image capture apparatus is not performed with a remaining power of power received from the power supply device.

11. The method to claim 10, further comprising in a case where the power supply capability of the power supply device determined by the determining unit is lower than the second power when the operating mode of the image capture apparatus is the moving image shooting mode, controlling the charging control circuitry such that charging of the battery is performed with power received from the power supply device, and controlling the power supply control circuitry such that power supply to the components of the image capture apparatus is not performed with power received from the power supply device.

12. The method to claim 10, wherein the power supply capability of the power supply device determined by the determining unit is 2.5 W, 4.5 W, 7.5 W, 15 W, or 100 W.

13. The method to claim 10, wherein the first power is 15 W.

14. The method to claim 10, wherein the second power is 4.5 W.

15. The method to claim 10, wherein power supplied from the power supply device is received by a power receiving circuitry of the image capture apparatus via a USB cable.

16. The method to claim 10, wherein the image capture apparatus is capable of acting as a digital camera.

17. The method to claim 10, wherein the image capture apparatus is capable of acting as a mobile phone or a smartphone.

18. The method to claim 10, wherein the image capture apparatus is capable of acting as a mobile terminal a tablet terminal.

19. A non-transitory storage medium that stores a program causing a computer to execute a method comprising:

causing a determining circuitry of an image capture apparatus to determine a power supply capability of a power supply device;

receiving power supplied from the power supply device;

in a case where the power supply capability of the power supply device determined by the determining unit is greater than or equal to a first power when an operating mode of the image capture apparatus is a moving image shooting mode, controlling a charging control circuitry of the image capture apparatus such that charging of a battery is performed with a second power obtained from power received from the power supply device, and controlling a power supply control circuitry of the image capture apparatus such that power supply to components of the image capture apparatus is performed with a remaining power of power received from the power supply device; and in a case where the power supply capability of the power supply device determined by the determining unit is greater than or equal to the second power and lower than the first power when the operating mode of the image capture apparatus is the moving image shooting mode, controlling the charging control circuitry such that charging of the battery is performed with the second power obtained from power received from the power supply device, and controlling the power supply control circuitry such that power supply to the components of the image capture apparatus is not performed with a remaining power of power received from the power supply device.

20. The non-transitory storage medium according to claim 19, wherein the method further comprising in a case where the power supply capability of the power supply device determined by the determining unit is lower than the second power when the operating mode of the image capture apparatus is the moving image shooting mode, controlling the charging control circuitry such that charging of the battery is performed with power received from the power supply device, and controlling the power supply control circuitry such that power supply to the components of the image capture apparatus is not performed with power received from the power supply device.

* * * * *